United States Patent [19]

Duembgen et al.

[11] 3,868,417

[45] Feb. 25, 1975

[54] SEPARATION OF ACRYLIC ACID FROM THE REACTION GASES FROM PROPYLENE OR ACROLEIN OXIDATION

[76] Inventors: Gerd Duembgen, 4 Sudetenstrasse, 6701, Dannstadt; Heinz Engelbach, 24 Kropsburgstrasse, 6703, Limburgerhof; Walter Frey, 24 Am Aubuckel, 6800, Mannheim; Richard Krabetz, 6 Unterer Waldweg, 6719, Kirchheim; Ulrich Lebert, 7 Borsigstrasse, 6700, Ludwigshafen; Fritz Triessen, 53 Bruesseler Ring, 6700, Ludwigshafen; Carl-Heinz Willersinn, 3/94 An der Froschlache, 6700, Ludwigshafen, all of Germany

[22] Filed: Aug. 23, 1973

[21] Appl. No.: 391,012

[52] U.S. Cl............... 260/526 N, 203/15, 203/16, 203/60, 203/DIG. 21
[51] Int. Cl............................................. C07c 57/04
[58] Field of Search................................ 260/526 N

[56] References Cited
UNITED STATES PATENTS

| | | |
|---|---|---|
| 3,344,178 | 9/1967 | Brown et al. ..................... 260/526 |
| 3,432,401 | 3/1969 | Tcherkawsky ..................... 260/526 |
| 3,507,915 | 4/1970 | Newman ............................. 260/526 |
| 3,527,677 | 9/1970 | Harpring ............................ 260/526 |
| 3,553,261 | 1/1971 | Sennewald et al. ................ 260/526 |
| 3,555,082 | 1/1971 | Sennewald et al. ................ 260/526 |
| 3,666,632 | 5/1972 | Honda et al. ...................... 260/526 |
| 3,798,264 | 3/1974 | Kubota et al. ..................... 260/526 |

*Primary Examiner*—James A. Patten
*Attorney, Agent, or Firm*—Johnston, Keil, Thompson & Shurtleff

[57] ABSTRACT

On the separation of acrylic acid from reaction gases from the oxidation of propylene or acrolein a countercurrent absorption is carried out with at least 8 parts by weight of carboxylic ester per part by weight of acrylic acid contained in the reaction gas, the dissolved acetic acid and the dissolved water are substantially completely expelled from the resulting absorption solution at elevated temperature by means of inert gases, the loaded inert gases are passed to the countercurrent absorption for the recovery of the acrylic acid contained therein, and the acrylic acid is distilled off under reduced pressure from the carboxylic ester solution which is free from acetic acid and water.

3 Claims, 1 Drawing Figure

PATENTED FEB 25 1975
3,868,417
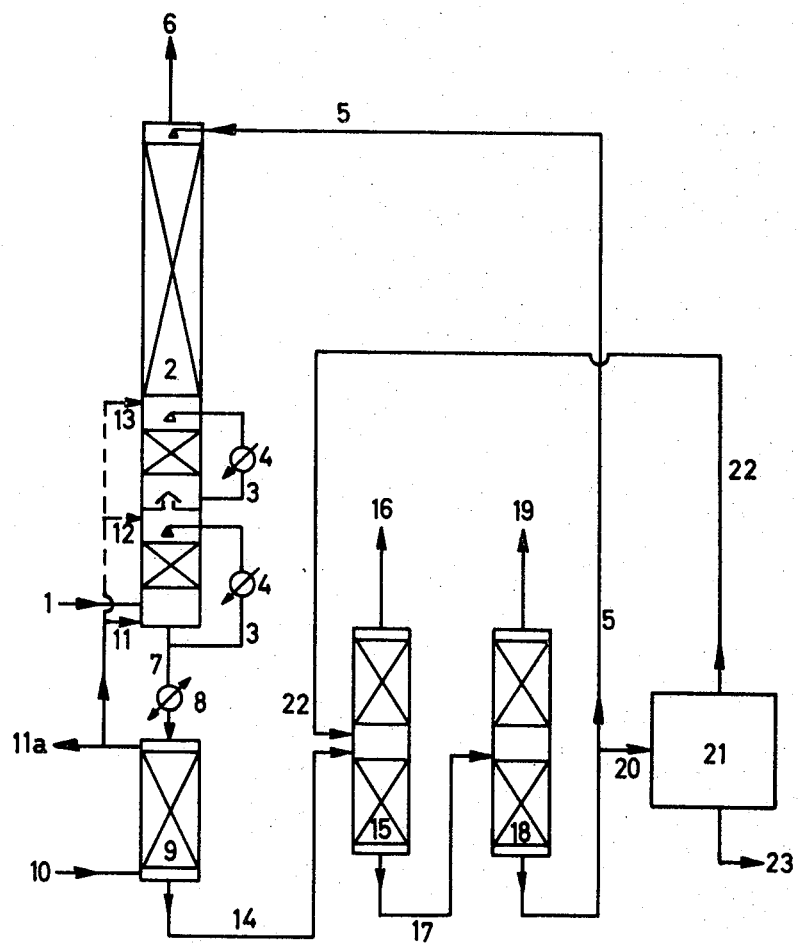

SEPARATION OF ACRYLIC ACID FROM THE REACTION GASES FROM PROPYLENE OR ACROLEIN OXIDATION

The present invention relates to a process for the separation of substantially water-free and acetic acid-free acrylic acid from reaction gases such as are obtained in the oxidation of propylene or acrolein.

In the production of acrylic acid by gas phase oxidation of propylene or acrolein with oxygen or oxygen-containing gases in the presence of catalysts (e.g. oxides of the elements molybdenum, chromium, vanadium and tellurium) at elevated temperature, generally accompanied by dilution of the reactants with inert gases or steam, a gaseous reaction mixture is obtained which contains, in addition to unconverted propylene and acrolein, acrylic acid and varying amounts of steam, oxides of carbon, nitrogen, oxygen, acetic acid, formaldehyde and maleic anhydride. The economy of the process is strongly dependent on the manner in which the acrylic acid is recovered from the reaction mixture and purified, in particular on the manner in which the water and the acetic acid are separated. Various methods of achieving this are known from the literature.

The recovery of aqueous acrylic acid by indirect or direct cooling of the reaction gases is known from British Pat. Nos. 948,687 and 953,763. Similar procedures are proposed in published German Patent Application No. K69986 IVb/12 o. The principal disadvantage of this method of operation is that the acrylic acid is obtained as a dilute aqueous solution of not more than 45% strength. The content of acrolein, acetic acid and formaldehyde in such solutions is an additional disadvantage. The separation of these components, particularly the acetic acid, necessitates considerable expenditure on the distillative and/or extractive separation of acrylic acid.

These disadvantages are partially overcome in the process of German published patent application No., 1,568,937 where the reaction gas from the propylene or acrolein oxidation is initially cooled from a temperature of 300° to 600°C to a temperature between 90° and 200°C, preferably to about 100° to 170°C, without condensation and is subsequently extracted in countercurrent with an ester of an aliphatic or aromatic mono- or di-carboxylic acid, whose alcoholic component contains 1 to 8 carbon atoms and whose acidic component contains 5 to 20 carbon atoms, or with tributyl or tricresyl phosphate at temperatures between 30° and 100°C and pressures between 0.5 and 5 bars, preferably under atmospheric pressure, the extracting agent being used in such an amount that the content of acrylic acid in the resulting extract is about 5 to 35%, in particular about 10 to 25%, by weight. Acrylic acid is distilled from the resulting extract in the form of a concentrated aqueous solution of for example 70% by weight strength containing acetic acid, and the distillation residue remaining is re-used for the extraction of reaction gas containing acrylic acid. In a preferred embodiment of this process acrolein is expelled from the acrylic acid-containing extract at elevated temperature, preferably at about 100° to 140°C before the distillation and the acrolein vapor is purified by means of the portions of the reaction gas that are not absorbed my the extractant, principally steam and unreacted propylene and/or acrolein, as well as formaldehyde, carbon monoxide, carbon dioxide and nitrogen. Water and formaldehyde are then partially condensed from the resulting gas mixture by cooling to about 20° to 70°C and the remaining gas is recycled to the oxidation with fresh propylene and/or acrolein.

A water- and acetic acid-containing acrylic acid of about 70% by weight strength, which contains only very small quantities of formaldehyde, can indeed be obtained in this known process, but one or more separate process steps are still required for the complete separation of the water and the acetic acid from the acrylic acid.

The object of the present invention is to obtain acrylic acid which is substantially free from water, acrolein, formaldehyde and acetic acid.

We have now found that acrylic acid can be obtained in an advantageous manner from reaction gases from the oxidation of propylene or acrolein by the use of a countercurrent absorption with carboxylic esters of melting point less than 30°C and boiling point at normal pressure greater than 160°C at elevated temperature and a pressure of 0.5 to 5 bars, when the countercurrent absorption is carried out at 50° to 80°C with at least 8 parts by weight of the carboxylic ester per part by weight of acrylic acid contained in the reaction gases, the dissolved acetic acid and the dissolved water are substantially completely expelled from the resulting absorption solution at 90° to 140°C and 0.5 to 5 bars by means of inert gases, the loaded inert gases are passed to the countercurrent absorption for the recovery of the acrylic acid contained therein, and the acrylic acid is distilled off from the water-free and acetic acid-free carboxylic ester solution under reduced pressure.

This procedure has a particularly small requirement for apparatus, subjects the acrylic acid to very little thermal treatment and minimizes polymer formation.

In the new process the hot reaction gases from the propylene or acrolein oxidation can be charged directly to the absorption column, preferably without preliminary cooling. The cooling of the gases and removal of the heat of absorption can for example take place in the column by means of one or more cooling loops.

Esters of aliphatic or aromatic monocarboxylic or dicarboxylic acids which melt below 30°C and have a boiling point at normal pressure above 160°C, generally between 160° and 360°C, preferably at 220° to 360°C, can be used as absorbents. Particularly suitable materials are the methyl, ethyl, n-butyl, iso-octyl-2-ethylhexyl and/or octyl esters of oleic acid, adipic acid and/or phthalic acid. In the case of the dicarboxylic acids the diesters are preferred. Esters of this type can be used alone or in admixture with one another. The esters are charged to the absorption column in such an amount that for each part by weight of acrylic acid in the reaction gas at least 8, preferably 10 to 20, parts by weight of ester are present. The temperature in the absorber is from 50° to 80°C, preferably 55° to 70°C. The pressure may be from 0.5 to 5 bar but preferably a pressure of 1 to 2 bars is chosen.

The absorber, which can for example be a packed or plate column, should in general have at least 5 theoretical plates, preferably 8 to 12 theoretical plates. In order to inhibit polymerization conventional stabilizers, for example phenothiazine, can be added to the ester.

For the removal of the acetic acid and water contained in the absorption solution by means of inert gases flowing in countercurrent a temperature of 90° to 140°C, preferably from 110° to 130°C, is used. The amount of inert gas depends on the temperature and is in general between 10 and 50%, preferably 15 to 30%, by volume, with reference to the volume of the reaction gas passed into the absorber. Suitable inert gases are nitrogen, air, carbon dioxide, carbon monoxide, flue gas and also the off-gas of the absorber after appropriate preliminary treatment for exhaustive removal of acetic acid and water, e.g. by cooling. For the desorption there can be used, for example, a packed or plate column which has in general at least 8, preferably 10 to 15, theoretical plates. The gas leaving the desorber contains acrylic acid besides acetic acid and water; it is recycled to the absorber for the recovery of the acrylic acid and leaves the system, together with the inert components of the reaction gas, the acrolein, the formaldehyde, the water and the acetic acid, by way of the top of the absorber.

Pure acrylic acid which is substantially free from acetic acid, water and other compounds is distilled off from the stripped ester solution containing acrylic acid at reduced pressure, for example 0.04 to 0.1 bar, in a packed or plate column. At the top of the distillation column the usual stabilizers for inhibiting polymerization can be charged. After separation of the acrylic acid the ester still contains maleic anhydride, which can be removed in a known manner, e.g. by distillation or extraction with water, before the ester is re-employed for the absorption. A portion of the solvent can be purified, e.g. by distillation, in order to remove highboiling by-products.

A particular embodiment of the process of the invention will now be described with reference to the accompanying drawing which shows diagrammatically a suitable apparatus.

The hot reaction gas from the oxidation stage of the propylene or acrolein oxidation, containing steam, acrolein, formaldehyde, acetic acid, maleic anhydride and inert gases as well as acrylic acid, is passed through line 1 to an absorption column 2. In the absorption column 2 the appropriate temperature for the absorption is achieved by means of liquid cycles 3 which are provided with heat exchangers 4. Ester material which countercurrently washes the acrylic acid from the reaction gases is fed to the top of the absorption column 2 through line 5. The non-absorbed components of the reaction gases together with ester spray leave the absorption column 2 by way of line 6. This off-gas can be further treated, e.g. by subsequent cooling, to recover the absorbent freaction and components of the reaction gas. The liquid discharge from the absorption column 2 contains a part of the acetic acid and water as well as acrylic acid and the ester and is passed viy line 7 through a heat-exchanger 8, where it is heated, to the top of a desorption column 9. Inert gas is charged to the bottoms of desorption column 9 through line 10, and the ester solution is treated countercurrently with the gas, acetic acid and water being substantially completely expelled from the solution. A major part of the gas leaving the desorption column overhead and containing acrylic acid as well as acetic acid and water, is led through line 11 and optionally through lines 12 or 13 into absorption column 2, the remainder if any being discharged through line 11a.

The liquid discharge from desorption column 9 is passed to a distillation column 15 via line 14. At the top of distillation column 15 pure acrylic acid is withdrawn by line 16.

The acrylic acid-free ester is passed from column 15 through line 17 to a distillation column 18 and maleic anhydride is distilled off there, being removed through line 19. The major part of the resulting purified ester is returned from column 18 through line 5, after cooling in a heat exchanger, to the top of absorption column 2. A bleed stream is taken off through line 20 and purified by distillation e.g. in a Sambay evaporator 21. The residue is discharged through line 23. The vaporized ester is passed through line 22 to the middle of the acrylic acid distillation column 15.

The following Example illustrates the process of the invention.

EXAMPLE

In a plant in accordance with the drawing 2100 liters (STP) per hour of reaction gas, containing by volume 2.4% acrylic acid, 0.2% acetic acid, 19% $H_2O$ and small amounts of maleic anhydride, formaldehyde and acrolein as well as a predominant amount of inert gases, were introduced at a temperature of 220°C through line 1 into the absorption column 2 which had two cooling liquid cycles 3 and 34 bubble trays. 1.48 kg per hour of o-diethyl phthalate at a temperature of 63°C were charged to the top of the absorption column via line 5. The reaction gas was cooled to 70°C with the aid of the first of the cooling liquid cycles 3 and to 64°C with the aid of the second of them. The effluent from the absorption column was heated to 120°C in heat-exchanger 8 and fed to the top of the desorption column 9. 500 liters (STP) per hour of nitrogen at a temperature of 90°C were introduced into the desorption column, which had 24 bubble trays, from below through line 10. The nitrogen leaving the top of the desorption column was loaded with acetic acid, water and acrylic acid and was passed through line 11 to absorption column 2. The nitrogen finally left the absorption column through line 6 together with the non-absorbed components of the reaction gas.

The desorption column effluent was charged through line 14 to the acrylic acid column 15 which had 20 bubble trays in the stripping section and 16 bubble trays in the rectifying section. In the acrylic acid column, which was operated at an overhead pressure of 0.065 bar with a reflux ratio of 1 (0.1% by weight of phenothiazine being added as stabilizer to the reflux), 163 g per hour of acrylic acid were distilled off and withdrawn through line 16. The acrylic acid contained as measurable impurities only 0.3% by weight of acetic acid and 0.2% by weight of water. The yield, based on the acrylic acid contained in the reaction gas, amounted to 99%.

The acrylic acid-free ester was passed from the bottoms of the acrylic acid column through line 17 into the distillation column 18 in which maleic anhydride was distilled off at 0.065 bar and withdrawn through line 19. The o-diethyl phthalate was recycled from the bottoms of the column 18 through line 5 and a heat-exchanger (not shown) to the absorption column 2. 45 g per hour were withdrawn from the ester cycle through line 20 and charged to a Sambay evaporator 21. In the evaporator the ester was distilled off from the withdrawn liquid under reduced pressure and the vapor was passed through line 22 to the acrylic acid column. 1 to 2 g per hour of a mixture of ester and high-boiling residue were discharged through line 23.

We claim:

1. A process for the separation of acrylic acid from reaction gases from the oxidation of propylene or acrolein by countercurrent absorption with carboxylic esters of melting point less than 30°C and boiling point under normal pressure of from 160° to 360°C at temperatures of 50° to 80°C and pressures of 0.5 to 5 bars, from 10 to 20 parts by weight of carboxylic ester being used per part by weight of acrylic acid in the reaction gas, wherein the dissolved acetic acid and the dissolved water are substantially completely expelled from the resulting absorption solution at 90° to 140°C and 0.5 to 5 bars by means of inert gases, the loaded inert gases are passed to the countercurrent absorption for the recovery of the acrylic acid contained in them and the acrylic acid is distilled off from the water-free and acetic acid-free carboxylic ester solution at 0.04 to 0.1 bar.

2. A process for the separation of acrylic acid from reaction gases from the oxidation of propylene or acrolein by countercurrent absorption with carboxylic esters of melting point less than 30°C and boiling point under normal pressure of from 160° to 360°C at temperatures of 50° to 80°C and pressures of 0.5 to 5 bars, from 10 to 20 parts by weight of carboxylic ester being used per part by weight of acrylic acid in the reaction gas, wherein the dissolved acetic acid and the dissolved water are substantially completely expelled from the resulting absorption solution at 90° to 140°C and 0.5 to 5 bars by means of from 10 to 50% by volume, based on the volume of the reaction gas, of inert gases, the loaded inert gases are passed to the countercurrent absorption for the recovery of the acrylic acid contained in them and the acrylic acid is distilled off from the water-free and acetic acid-free carboxylic ester solution at 0.4 to 0.1 bar.

3. A process for the separation of acrylic acid from reaction gases from the oxidation of propylene or acrolein by countercurrent absorption with carboxylic esters of melting point less than 30°C and boiling point under normal pressure of from 160° to 360°C at temperatures of 55° to 70°C and pressures of 1 to 2 bars, from 10 to 20 parts by weight of carboxylic ester being used per part by weight of acrylic acid in the reaction gas, wherein the dissolved acetic acid and the dissolved water are substantially completely expelled from the resulting absorption solution at 110° to 130°C and 0.5 to 5 bars by means of from 15 to 30% by volume, based on the volume of the reaction gas, of inert gases, the loaded inert gases are passed to the countercurrent absorption for the recovery of the acrylic acid contained in them and the acrylic acid is distilled off from the water-free and acetic acid-free carboxylic ester solution at 0.04 to 0.1 bar.

* * * * *

UNITED STATES PATENT OFFICE
CERTIFICATE OF CORRECTION

PATENT NO. : 3,868,417
DATED : February 25, 1975
INVENTOR(S) : DUEMBGEN et al

It is certified that error appears in the above-identified patent and that said Letters Patent are hereby corrected as shown below:

In the Heading, insert--[30] August 24, 1972    Germany

P 22 41 714.7--

Signed and Sealed this twenty-fifth Day of May 1976

[SEAL]

Attest:

RUTH C. MASON
Attesting Officer

C. MARSHALL DANN
Commissioner of Patents and Trademarks